3,021,780
WHISKY AGING APPARATUS
Arden B. Bobbe, Rte. 1, Scandinavia, Wis.
Filed May 27, 1960, Ser. No. 32,280
6 Claims. (Cl. 99—277.1)

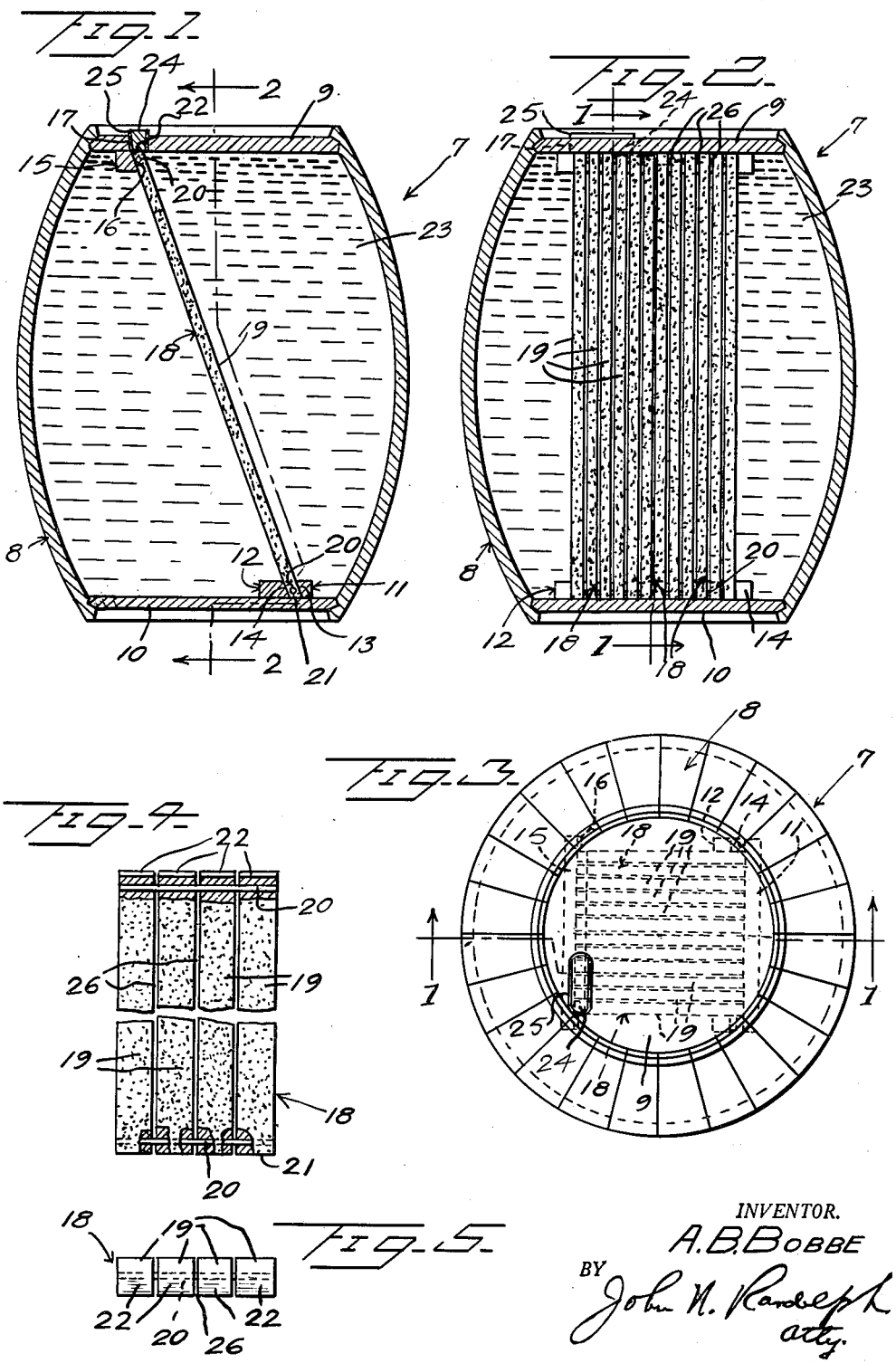

This invention relates to an apparatus for aging whisky and more particularly bourbon whisky. Bourbon whisky is conventionally aged in internally charred white oak barrels. Only the finest white oak can be used for such barrels and the cost of a fifty gallon barrel is approximately $30.00. Since the barrel can only be used once for aging bourbon whisky and as the barrel has substantially no resale value after use, approximately one-half the cost of producing aged bourbon whisky is accounted for by the cost of the barrel.

Accordingly, it is an object of the present invention to provide a container and insert for aging whisky, especially bourbon, wherein the container or barrel is formed of white oak which is not charred and the insert comprises grates formed of charred white oak which are removably contained in the barrel to accomplish the aging process of the bourbon contents and which removable grates may be replaced so that the barrel can be re-used.

A further object of the invention is to provide a whisky aging apparatus including novel means for demountably supporting the charred grates within the barrel to retain the grates in position to enable ready removal of the grates even though the barrel is subjected to agitation, as is conventional, for hastening the aging of its contents.

Various other objects and advantages of the invention will hereinafter become more fully apparent from the following description of the drawing, illustrating a presently preferred embodiment thereof, and wherein:

FIGURE 1 is a vertical sectional view of the whisky aging apparatus, taken substantially along the line 1—1 of FIGURES 2 or 3;

FIGURE 2 is a vertical sectional view taken approximately at a right angle to FIGURE 1, along the line 2—2 of FIGURE 1;

FIGURE 3 is a top plan view of the apparatus;

FIGURE 4 is an enlarged fragmentary plan view, partially in section, of one of the removable grates, and FIGURE 5 is an end elevational view thereof.

Referring more specifically to the drawing, the whisky aging apparatus in its entirety is designated generally 7 and includes a barrel 8 formed of white oak having ends 9 and 10. The barrel 8 may be of conventional shape, size and thickness for the purpose of storing whisky for aging, usually of fifty gallon capacity and formed of one inch thick wood. The end 10, constituting the bottom of the barrel 8, is provided with two cleats 11 and 12 which are secured to its inner or upper side in slightly spaced apart substantially parallel relation to one another. The cleats 11 and 12 have adjacent faces 13 and 14, respectively, which are disposed at an incline to the plane of the bottom 10 and substantially parallel to one another, as best illustrated in FIGURE 1.

A cleat 15 is secured to the underside of the top 9 and is disposed substantially parallel to the cleats 11 and 12. The cleat 15 is offset from the cleats 11 and 12 to a substantial extent, as seen in FIGURES 1 and 3. The cleat 15 has an inner side or face 16 which is disposed substantially parallel to the inner sides or faces 13 and 14. The barrel top 9 has an elongated opening 17 which is disposed parallel to the cleat 15 and which opens into the barrel 8 along the inner cleat face 16.

The apparatus 7 includes a plurality of grates 18 which are contained within the barrel 8. As illustrated in the drawing, each grate 18 is shown composed of four corresponding elongated wooden bars 19, each of which is preferably square in cross section. The four bars 19 are connected together by dowels 20 which extend transversely through the wooden bars adjacent the ends of said bars and which are secured therein by a press fit engagement for positioning the bars 19 in slightly spaced apart relation to one another, as best illustrated in FIGURES 4 and 5. The four bars 19, comprising each grate 18, are charred on all four sides thereof.

The opening 17 is of a length somewhat greater than the width of each grate 18, as seen in FIGURE 2, and is of a width somewhat greater than the thickness of each grate, as seen in FIGURE 1. Accordingly, one of the grates 18 can be inserted through the opening 17 into the barrel 8 and directed so that the leading or lower end thereof will enter the space between the cleat faces 13 and 14 to rest upon the bottom 10, and when thus disposed, an upper part of one side of said grate 18 will bear upon the cleat face 16 and the upper end of the grate will be disposed slightly below the top 9. The grate 18 can then be slid from left to right as seen in FIGURE 2 from beneath the opening 17, so that additional grates can be applied in the same manner. While three of the grates 18 are shown applied to the barrel 8 in FIGURES 2 and 3, it will be understood that the number can be varied. It will also be understood that the number of bars 19 of which each grate 18 is composed may be varied, so long as the grate is of a proper size to pass through the opening 17. The lower ends of the bars 19 of each grate 18 are cut at an angle, as seen at 21, to rest flush upon the bottom 10 when the grate 18 is disposed substantially parallel to the cleat faces 13, 14 and 16. The upper ends 22 of the grate bars 19 are disposed parallel to the lower ends 21 so as to assume positions beneath and substantially parallel to the barrel top 9.

The whisky to be aged is indicated at 23 in FIGURES 1 and 2 and the barrel 8 may be filled with the whisky through the opening 17 after the grates 18 have been applied. The opening 17 is then closed and sealed by an elongated plug 24 which may have a surrounding gasket 25 and which is preferably tapered to conformably fit the inwardly tapered opening 17. The slight spacing between the grate bars 19 provides spaces 26 through which the liquid 23 can flow through the grates 18 so that all sides of the bars 19 will function in accomplishing the aging of the whisky. It will be readily apparent that the grates 18 will be maintained by the cleats 11, 12 and 15 positioned substantially as shown in FIGURES 1, 2 and 3, within the barrel 8, even though the barrel is agitated to hasten the aging of the contents 23.

After the aging process has been completed the closure 24 can be removed for removing the aging grates 18, either before or after the aged whisky 23 has been removed from the barrel 8. The barrel 8 can then be re-used with a new set of charred grates 18 and the previously used grates can be disposed of. It will be obvious that the cost of replacing a set of grates 18 will be materially less than the cost of replacing a charred barrel. The set of grates 18 provides an adequate charred surface for effecting the aging of the whisky 23 since all four sides of each grate bar 19 is charred. In removing the grates 18, it will be understood that after the first grate has been removed the remaining grates can be successively moved into positions in alignment with the opening 17. Since the over-all length of each grate 18 is greater than the spacing between the barrel ends 9 and 10, the grates may not swing to positions out of engagement with the cleat face 16 and are thus retained accessible to be engaged and removed.

Various modifications and changes are contemplated and may be resorted to, without departing from the func-

I claim as my invention:

1. A whisky aging apparatus comprising, in combination with a barrel adapted to contain whisky for aging including a top wall and a bottom, a cleat secured to the inner side of said bottom, a cleat secured to the underside of the top wall in offset substantially parallel relation to said first mentioned cleat, a plurality of aging grates having lower ends resting on said bottom and lower portions bearing against said first mentioned cleat, said grates having upper portions bearing against the last mentioned cleat and disposed beneath and adjacent the top wall, each of said grates comprising a plurality of charred white oak bars disposed in spaced apart substantially parallel relation to one another, and said top wall having an opening disposed above the side of the second mentioned cleat engaged by the grates and of a length and width to accommodate the passage of the grates therethrough for applying the grates to the barrel and for removing the grates therefrom.

2. A whisky aging apparatus as in claim 1, each of said grates including dowels extending transversely through the bars thereof and connecting the bars together in spaced apart relation to one another.

3. A whisky aging apparatus as in claim 1, said cleats having inclined sides facing in opposite directions and disposed substantially parallel to one another and against which the end portions of the grates bear for maintaining the grates at an incline within the barrel.

4. A whisky aging apparatus as in claim 1, a third cleat secured to the inner side of the bottom in spaced apart substantially parallel relation to the first mentioned cleat and combining therewith to form a groove disposed at an incline and in which the lower end portions of the grates are received.

5. A whisky aging apparatus as in claim 1, and a closure detachably mounted in and sealing said access opening of the top wall.

6. In an apparatus for containing whisky to be aged comprising, in combination with a barrel for storing whisky including a bottom and a top wall, a plurality of aging grates detachably mounted in said barrel, each of said grates comprising a plurality of elongated bars formed of charred white oak and means connecting said bars together in spaced apart relation to one another, cleat members secured to inner sides of the bottom and top wall in offset substantially parallel relation to one another and engaged by opposite sides of end portions of the grates for maintaining the grates at an incline within the barrel, and said top wall having an access opening to accommodate the passage of the grates therethrough between said cleat members.

References Cited in the file of this patent
UNITED STATES PATENTS

| | | |
|---|---|---|
| 2,135,622 | Nagle | Nov. 8, 1938 |
| 2,289,245 | Dant | July 7, 1942 |
| 2,657,629 | Gibson | Nov. 3, 1953 |